United States Patent
Nishiyama et al.

(10) Patent No.: US 6,885,526 B2
(45) Date of Patent: Apr. 26, 2005

(54) THIN FILM MAGNETIC HEAD COMPRISING SION FILM

(75) Inventors: Yoshihiro Nishiyama, Niigata-ken (JP); Yasuo Hayakawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/834,085

(22) Filed: Apr. 11, 2001

(65) Prior Publication Data

US 2001/0030841 A1 Oct. 18, 2001

(30) Foreign Application Priority Data

Apr. 13, 2000 (JP) ........................ 2000-111702

(51) Int. Cl.[7] .............................. G11B 5/39; G11B 5/127
(52) U.S. Cl. ........................ 360/320; 360/126; 360/120
(58) Field of Search ..................... 360/126, 120, 360/320, 323

(56) References Cited

U.S. PATENT DOCUMENTS

| | | | |
|---|---|---|---|
| 5,001,589 A | * | 3/1991 | Rask et al. ................. 360/120 |
| 5,719,730 A | * | 2/1998 | Chang et al. ............... 360/317 |
| 6,118,623 A | | 9/2000 | Fatula, Jr. et al. |
| 6,219,206 B1 | * | 4/2001 | Odai et al. ................. 360/320 |
| 6,239,948 B1 | * | 5/2001 | Wu et al. ................... 360/120 |
| 6,252,749 B1 | * | 6/2001 | Hayakawa .................. 360/320 |
| 2002/0176206 A1 | * | 11/2002 | Sato ........................... 360/126 |

FOREIGN PATENT DOCUMENTS

| | | | | | |
|---|---|---|---|---|---|
| JP | 02254607 A | * | 10/1990 | ............ | G11B/5/23 |
| JP | 05135320 A | * | 6/1993 | ............ | G11B/5/23 |
| JP | 11-16127 | | 1/1999 | | |
| JP | 11-161915 | | 6/1999 | | |
| WO | WO 9523878 A1 | * | 9/1995 | ............ | C23C/14/00 |

* cited by examiner

*Primary Examiner*—William J. Klimowicz
(74) *Attorney, Agent, or Firm*—Brinks Hofer Gilson & Lione

(57) ABSTRACT

A thin film magnetic head includes a gap layer which may be made of a SiON film to increase Young's modulus E to about 123.3 (GPa) or more. As a result, the gap layer is less pushed from a surface facing a recording medium in the height direction during lapping of the surface facing the recording medium, thereby decreasing the amount of protrusion of the gap layer from the facing surface as compared with a conventional magnetic head.

8 Claims, 6 Drawing Sheets

SURFACE FACING RECORDING MEDIUM

THIN FILM MAGNETIC HEAD COMPRISING SION FILM

BACKGROUND OF THE INVENTION

1. Field of the Invention

The present invention relates to a combination type thin film magnetic head comprising, for example, a recording head and a reproducing head and mounted on a floating thin film magnetic head slider, and particularly to a thin film magnetic head in which the amount of protrusion of a gap layer from a surface facing a recording medium can be decreased, as compared with a conventional magnetic head, and a method of manufacturing the thin film magnetic head.

2. Description of the Related Art

FIG. 11 is a longitudinal sectional view of a conventional thin film magnetic head.

In this thin film magnetic head, a reproducing head (MR head) h1 employing a magnetoresistive effect and a recording inductive head h2 are laminated on the trailing side end surface of a slider which constitutes, for example, a flying head.

The reproducing head h1 comprises a lower shield layer made of Sendust, a NiFe alloy (permalloy), or the like, a lower gap layer made of a nonmagnetic material such as $Al_2O_3$ (alumina) or the like and formed on the lower shield layer, and a magnetoresistive element 2 formed on the lower gap layer. The magnetoresistive element 2 comprises a GMR (giant magnetoresistive) element or AMR (anisotropic magnetoresistive) element, for example, a spin valve magnetoresistive element, in which the electric resistance is changed by the influence of an external magnetic field from the recording medium so that a recording signal can be reproduced.

Furthermore, an upper gap layer made of a nonmagnetic material such as alumina or the like is formed on the magnetoresistive element 2, and a lower core layer 3 made of a magnetic material is formed on the upper gap layer.

Furthermore, a gap layer 9 made of $Ta_2O_5$ or $SiO_2$ is formed on the lower core layer 3, and a coil layer 6 is spirally patterned on the gap layer 9 with an insulating layer provided therebetween and made of an organic insulating material. An insulating layer 7 made of an organic insulating material is formed on the coil layer 6, and an upper core layer 8 made of a magnetic material is patterned on the insulating layer 7.

As shown in FIG. 11, the front end 8a of the upper core layer 8 is opposed to the lower core layer 3 with the gap layer provided therebetween, and the base end 8b is magnetically connected to the lower core layer 3.

In manufacturing the thin film magnetic head shown in FIG. 11, the thin film magnetic head shown in FIG. 11 is deposited on the trailing-side end surface of a thin film magnetic head slider composed of $Al_2O_3$—TiC (alumina-titanium carbide), and then the thin film magnetic head slider is processed by lapping the surface facing a recording medium.

In the above-described conventional magnetic head, the gap layer 9 interposed between the lower core layer 3 and the upper core layer 8 comprises a $Ta_2O_5$ film or $SiO_2$ film. The reason for this is that in the step of trimming the upper core layer 8 and the lower core layer 3 after the formation of the upper core layer 8 shown in FIG. 11 in order to prevent the occurrence of side fringing in writing of a recording signal on the recording medium from the inductive had h2, excess portions of the gap layer 9 comprising a $SiO_2$ film can be appropriately removed by reactive ion etching to permit proper trimming.

However, it was found that the gap layer 9 comprising a $Ta_2O_3$ $Ta_2O_5$film or $SiO_2$ film causes the following problems.

The $Ta_2O_5$-film or $SiO_2$ film has a lower elastic coefficient than the lower core layer 3 and the upper core layer 8, and thus the gap layer 9 is pushed from the facing surface in the height direction (the Y direction shown in the drawing) when the surface facing the recording medium is polished in the step of processing the thin film magnetic head slider by lapping the facing surface.

Therefore, after the lapping step is completed, the gap layer 9 pushed in the height direction protrudes toward the recording medium side (the direction opposite to the Y direction) from the surface facing the recording medium due to restoring force.

Although the amount of protrusion T1 ranges from about several nm to about tens of nm, the problem of such protrusion of the gap layer 9 increases the possibility that the protruding portion of the gap layer 9 collides with the recording medium when the flying amount of the thin film magnetic head slider above the recording medium decreases with increases in the recording density in future. Therefore, the gap layer 9 must be formed to prevent protrusion from the surface facing the recording medium as much as possible.

SUMMARY OF THE INVENTION

Accordingly, the invention has been achieved for solving the above problem, and it is an object to provide a thin film magnetic head and a method of manufacturing the same in which the amount of protrusion of a gap layer may be decreased by adjusting the material or Young's modulus of the gap layer, as compared with a conventional magnetic head.

In one aspect, a thin film magnetic head comprises an insulating gap layer provided between cores made of a magnetic material, and a coil for inducing a recording magnetic field in the cores, wherein the gap layer comprises a SiON film.

Although a conventional recording inductive head comprises a gap layer comprising a $SiO_2$ film, the thin film magnetic head comprises the gap layer comprising a SiON film composed of Si, O and N in consideration of a SiN film having a higher elastic coefficient than the $SiO_2$ film. A SiN film is not generally used as the gap layer because a conventional sputtering method requires means for increasing the substrate temperature or the like, thereby causing difficulties in manufacturing. As seen from the experimental results which will be described below, the SiON film has a higher Young's modulus than the $SiO_2$ film, and thus the use of the SiON film as the gap layer may decrease the amount of protrusion of the gap layer from the surface facing the recording medium as compared with the conventional thin film magnetic head.

Therefore, even when the amount of flying of the thin film magnetic head slider above the recording medium decreases, collision of the thin film magnetic head slider with the recording medium can be appropriately avoided.

In another aspect, a thin film magnetic head comprises a magnetoresistive element capable of detecting a recording signal due to a change in electric resistance with an external magnetic field, and shield layers formed above and below the magnetoresistive element with gap layers provided therebetween, wherein at least one of the gap layers comprises a SiON film.

Therefore, it is possible to suppress protrusion of the gap layer on the reproducing head side from the facing surface.

The Young's modulus E of the gap layers is preferably about E>123.2 (GPa). Therefore, the amount of protrusion of the gap layer from the surface facing the recording medium may be decreased to an amount smaller than the conventional head. Specifically, the amount of protrusion may be suppressed to about 3.5 nm or less.

The atomic ratio of N of the SiON film is preferably about 0 (at %)<N atomic %≦6 (at %). With the N atomic % within the above range, the Young' modulus of the gap layer may be increased to about 123.2 (GPa) or more.

The Young's modulus E of the gap layer is preferably about E≧127.4 (GPa). This permits a further decrease in the amount of protrusion of the gap layer from the surface facing the recording medium, as compared with the conventional magnetic head. Specifically, the amount of protrusion may be suppressed to about 3.0 nm or less.

In this case, the atomic ratio of N of the SiON film is preferably about 1 (at %)≦N atomic %≦6 (at %). With the N atomic % within the above range, the Young' modulus of the gap layer can be increased to about 127.4 (GPa) or more.

In a further aspect, a thin film magnetic head comprises an insulating gap layer between cores made of a magnetic material, a coil for inducing a recording magnetic field in the cores, wherein the gap layer comprises a $SiO_2$ film, and the Young's modulus E of the gap layer is about E>123.2 (GPa).

The conventionally used $SiO_2$ film may be used as the gap layer under the condition that the Young's modulus E is more than about 123.2 (GPa).

With the gap layer having a Young's modulus of about 123.2 (GPa) or more, even when the $SiO_2$ film is used as the gap layer, the amount of protrusion of the gap layer from the surface facing the recording medium can be appropriately decreased. Specifically, the amount of protrusion may be suppressed to about 3.5 nm or less.

With the gap layer comprising the $SiO_2$ film, a manufacturing method described below must be used for increasing the Young's modulus to about 123.2 (GPa) or more.

In a further aspect, a thin film magnetic head comprises a magnetoresistive element capable of detecting a recording signal due to a change in electric resistance with an external magnetic field, and shield layers formed above and below the magnetoresistive element with gap layers provided therebetween, wherein at least one of the gap layers comprises a $SiO_2$ film, and the Young's modulus E of the gap layer is about E>123.2 (GPa).

This permits the suppression of protrusion of the gap layer in the reproducing head.

The Young's modulus E of the gap layer is preferably about E≧127.4 (GPa). This permits a proper decrease in the amount of protrusion of the gap layer from the surface facing the recording medium. Specifically, the amount of protrusion may be suppressed to about 3.0 nm or less.

A method of manufacturing a thin film magnetic head comprises the steps of arranging a target and a substrate opposite to the target in a deposition apparatus, and forming a gap layer comprising a SiON film on the substrate, wherein in forming the gap layer of the thin film magnetic head, the target composed of $SiO_2$ is prepared, and then sputtered with $N_2$ gas used as a sputtering gas flowing into the apparatus to form the gap layer comprising a SiON film.

In this way, method may use the conventionally used $SiO_2$ target and form the gap layer comprising a SiON film by using only $N_2$ gas as the sputtering gas, and exhibit ease of the manufacturing steps and excellent reproducibility.

The flow rate ratio of the $N_2$ gas in the sputtering gases is preferably about 0%<flow rate ratio of $N_2$ gas≦30%. In the present invention, the flow rate ratio of the $N_2$ gas may be freely set in the above range, and can easily be controlled. The reason for setting the flow rate ratio of the $N_2$ gas to about 30% or less is that with a flow rate ratio of over about 30%, the Young's modulus of the SiON film starts to deteriorate.

The flow rate ratio of the $N_2$ gas is preferably in the range of about 5%≦flow rate ratio of $N_2$ gas≦30%. In this case, the Young's modulus E of the gap layer can be increased to about 127.4 (GPa) or more.

In forming the gap layer, a bias electric power is preferably supplied to the substrate side. It is confirmed by experiment, which will be described below, that the Young's modulus of the SiON film can be improved by supplying the bias electric power.

In this way, the Young's modulus may be improved by supplying the bias electric power possibly due to the tendency of the SiON film toward a closest-packed atomic arrangement.

In a further aspect, a method of manufacturing a thin film magnetic head comprises the steps of arranging a target and a substrate opposite to the target in a deposition apparatus, and forming a gap layer comprising a $SiO_2$ film on the substrate, wherein in forming the gap layer of the thin film magnetic head, the target composed of $SiO_2$ is prepared, and then sputtered with the bias electric power supplied to the substrate to form the gap layer comprising a $SiO_2$ film having a Young's modulus E of about E>123.2 (GPa).

As described above, the gap layer comprising a $SiO_2$ film may be formed, but the film is deposited under the condition that the bias electric power is supplied to the substrate side. In this case, the Young's modulus of the gap layer may be increased to about 123.2 (GPa) or more.

A conventionally used $SiO_2$ target can be used as it is, and only the bias electric power is supplied to the substrate during deposition, thereby exhibiting ease of the manufacturing steps and excellent reproducibility.

The bias electric power is preferably about 10 W or more. With a bias electric power of about 10 W or more, the Young's modulus of the gap layer may be increased to about 127.4 (GPa) or more.

Other systems, methods, feature, and advantages of the invention will be or will become apparent to one skilled in the art upon examination of the following section figures and detailed description. All such additional systems, methods, features, and advantages are intended to be included within this description, within the scope of the invention, and protected by the accompanying claims.

BRIEF DESCRIPTION OF THE DRAWINGS

The invention may be better understood with reference to the following section figures and detailed description. The components in the figures are not necessarily to scale, emphasis placed upon illustrating the principles of the invention.

DESCRIPTION OF THE PREFERRED EMBODIMENTS

Figure 1:
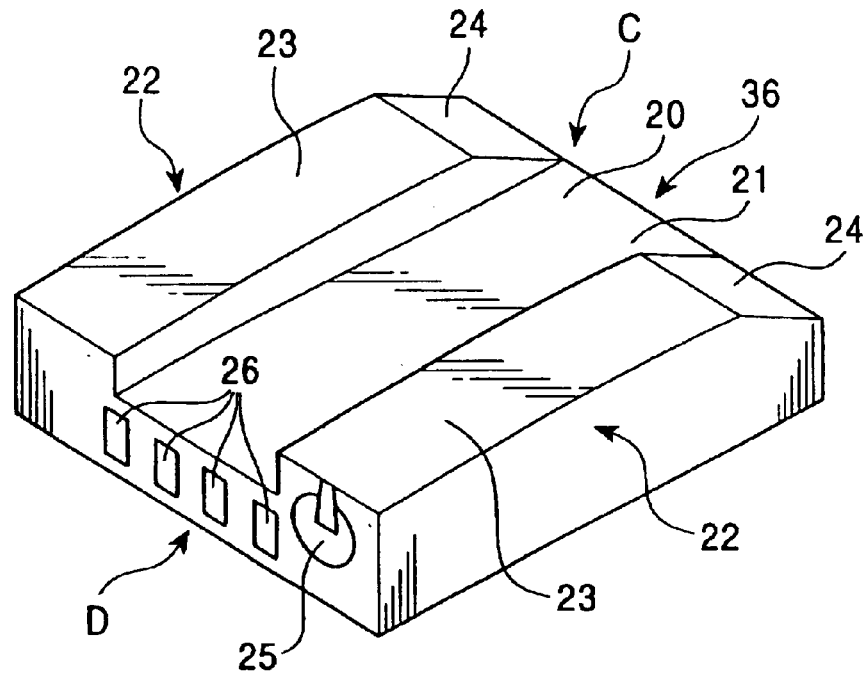
FIG. 1 represents a partial perspective view of a thin film magnetic head slider according to one embodiment.
Figure 2:
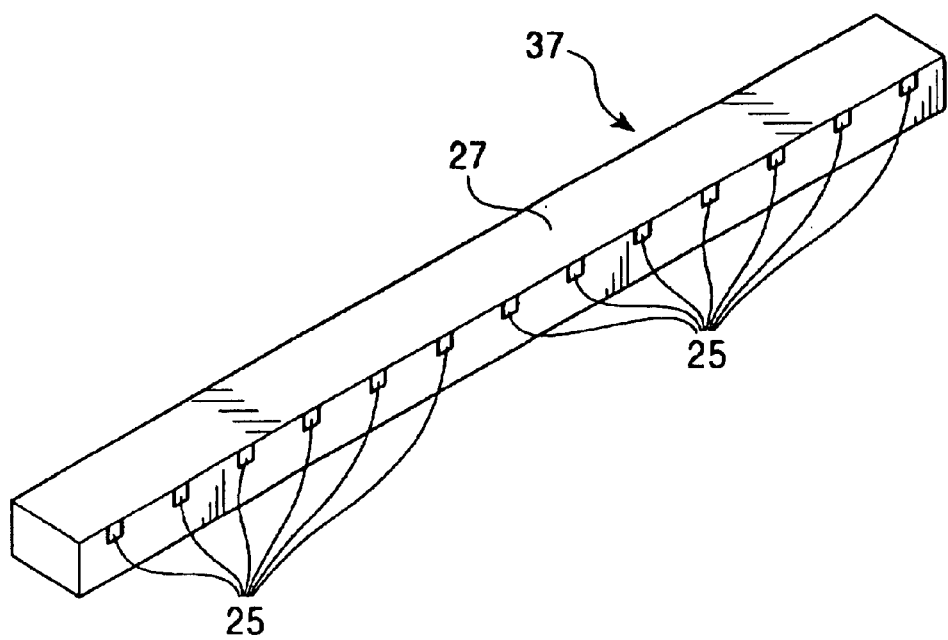
FIG. 2 represents a partial perspective view of a slider bar according to one embodiment.

FIG. 1 represents a perspective view of a thin film magnetic head slider. FIG. 2 represents a perspective view of a slider bar.

The substrate 20 shown in FIG. 1 is made of a ceramic material such as alumina-titanium carbide, Si (silicon), or the like, and comprises an air groove 21 formed on the side facing a hard disk serving as a recording medium, and rails 22 formed on both sides of the air groove 21.

As shown in FIG. 1, each of the rails 22 is formed in a predetermined crown shape, and has an air bearing or floating surface 23 (ABS) facing the recording medium. Each of the rails 22 also has an inclined portion 24 formed at the leading-side end C thereof.

Furthermore, a thin film magnetic head 25 is provided at the trailing-side end D of the substrate 20. The thin film magnetic head 25 comprises a laminate of a reproducing MR head comprising a magnetoresistive element such as an AMR element, a spin valve thin film element, or the like, and a recording inductive head comprising a core and coil made of a magnetic material.

The magnetoresistive element comprises an AMR (anisotropic magnetoresistive) element, a GMR (giant magnetoresistive) element such as a spin valve element, or the like, in which an external magnetic field from the recording medium is detected as a change in electric resistance so that a recording signal is detected as a change in voltage.

As shown in FIG. 1, electrode terminals 26 comprising a thin film and led from the thin film magnetic head 25 are formed at the trailing-side end D of the substrate 20.

In the thin film magnetic head slider 36 shown in FIG. 1, a supporting member comprising a flexure or load beam comprising a plate spring is provided on the lower side, i.e., the side opposite to the surface 23 facing the recording medium, so that the base end (mount) of the supporting member is mounted at a predetermined position of a hard disk device.

A thin film magnetic head device provided with the thin film magnetic head slider 36 shown in FIG. 1 is operated in a CCS system or the like, in which recording and reproduction are performed by the thin film magnetic head 25 with the thin film magnetic head slider 36 floating by a predetermined amount above the recording medium. The amount of floating is about 10 nm, or possibly further decreased with increases in the recording density in future.

The thin film magnetic head slider 36 shown in FIG. 1 is formed from the slider bar 37 shown in FIG. 2, in which a plurality of thin film magnetic heads 25 are formed in a line pattern.

After the slider bar 37 is formed, the surface 27 of the slider bar 37, which faces the recording medium, is lapped, and then the slider bar 37 is cut at the portions between the thin film magnetic heads 25 to produce the thin film magnetic head slider 36 shown in FIG. 1.

Figure 3:
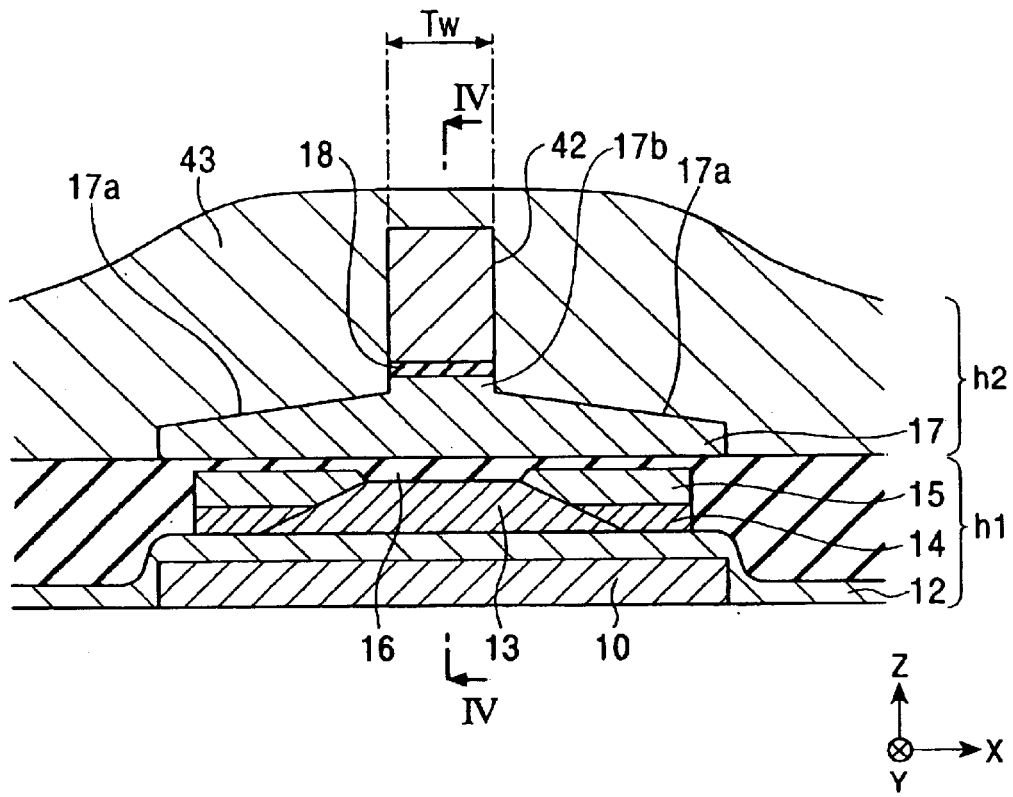
FIG. 3 represents an enlarged sectional view showing the structure of a thin film magnetic head according to one embodiment.
Figure 4:
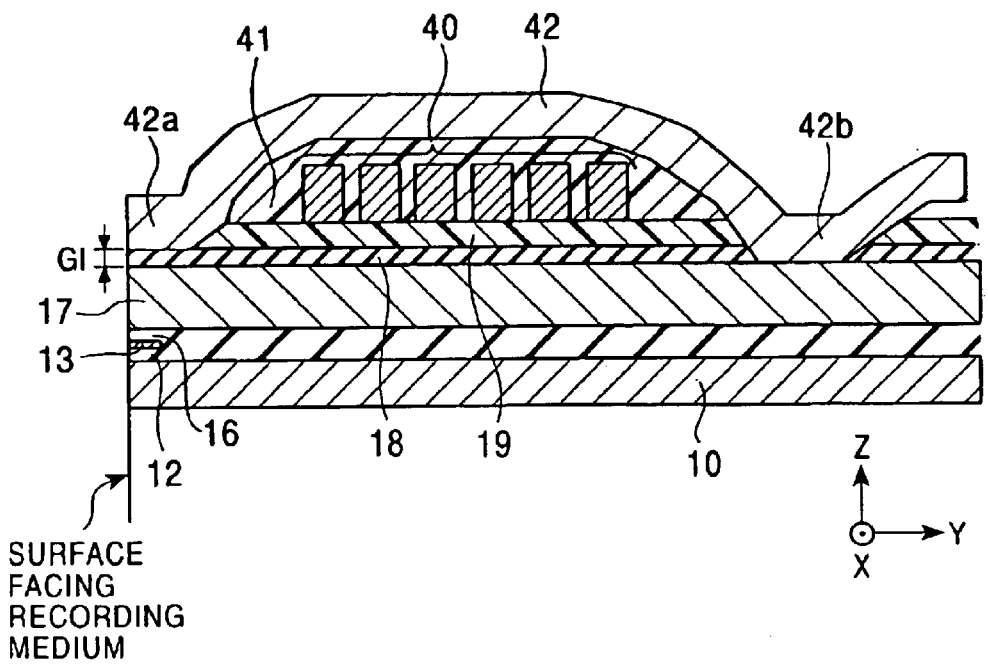
FIG. 4 represents a partial longitudinal sectional view of the thin film magnetic head taken along line IV—IV in FIG. 3.

The construction of the thin film magnetic head 25 is described below. FIG. 3 represents a partial front view showing the structure of a thin film magnetic head as viewed from the surface side facing the recording medium. FIG. 4 is a partial sectional view of the thin film magnetic head taken along line IV—IV in FIG. 3.

The thin film magnetic head shown in FIGS. 3 and 4 is a so-called combination type thin film magnetic head comprising a laminate of a reproducing head (MR head) h1 and a recording inductive head h2.

The reproducing head h1 utilizes a magnetoresistive effect for detecting a leakage magnetic field from the recording medium such as a hard disk or the like to read a recording signal. Reference numeral 10 denotes a lower shield layer made of a magnetic material.

In the reproducing head h1, a lower gap layer 12 made of a nonmagnetic material is formed on the lower shield layer 10. Furthermore, a magnetoresistive element 13 is formed on the lower gap layer 12, in which the electric resistance is changed by the influence of a leakage magnetic field from the recording medium to detect a recording signal. Reference numeral 14 denotes a hard bias layer, and reference numeral 15 denotes an electrode layer for supplying a sensing current to the magnetoresistive element 13.

As shown in FIG. 3, an upper gap layer 16 made of a nonmagnetic material is formed on the magnetoresistive element 13, and a lower core layer 17 made of a magnetic material such as permalloy or the like is formed on the upper gap layer 16.

In this embodiment, the lower core layer 17 has both the function as an upper shield layer of the MR head h1, and the function as a core layer of the inductive head h2. However, the upper shield layer and the core layer may be formed individually.

As shown in FIG. 4, a gap layer 18 made of a nonmagnetic material is formed on the lower core layer 17. Furthermore, a coil layer 40 is spirally patterned on the gap layer 18 with an insulating layer 19 formed therebetween and made of an organic insulating material such as resist, polyimide, or the like. Also, an insulating layer 41 made of an organic insulating material such as resist, polyimide, or the like is formed on the coil layer 40, and an upper core layer 42 made of a magnetic material such as permalloy or the like is patterned on the insulating layer 41. Furthermore, a protecting layer 43 made of $Al_2O_3$ or the like is formed on the upper core layer 42.

As shown in FIG. 4, the front end 42a of the upper core layer 42 is opposed to the lower core layer 17 with the gap layer 18 provided therebetween at the surface facing the recording medium. The base end 42b of the upper core layer 42 is magnetically connected to the lower core layer 17.

As shown in FIG. 3, the upper core layer 42 is formed with a width dimension, which coincides with the track width Tw, in the track width direction (the X direction shown in the drawing), and the gap layer 18 is also formed in a width dimension, which coincides with the track width Tw, in the track width direction.

As shown in FIG. 3, the lower core layer 17 has a protrusion 17b formed opposite to the upper core layer 42 with the gap layer 18 provided therebetween, and inclined surfaces 17a which start from the base end of the protrusion 17b and which are inclined in the direction away from the upper core layer 42.

In order to form the gap layer 18 with the track width Tw and the protrusion 17b and the inclined surfaces 17a in the lower core layer 17, as shown in FIG. 3, a trimming step is required. By using the thin film magnetic head shown in FIG. 3, which is subjected to the trimming step, side fringing occurs less in recording on the recording medium.

In one embodiment, the gap layer 18 comprises a SiON film. By using the SiON film, the trimming step may be appropriately performed.

Even when the surface 27 of the slider bar 37 shown in FIG. 2, which faces the recording medium, is lapped, the gap layer 18 protrudes less from the surface 27 facing the recording medium. Therefore, the thin film magnetic head slider 36 shown in FIG. 1 may be prevented from colliding with the recording medium as much as possible during floating of the thin film magnetic head slider 36 above the recording medium.

The SiON film used as the gap layer 18 has a higher elastic coefficient than a $SiO_2$ film. Thus, the gap layer 18 is pushed less from the facing surface in the height direction (the Y direction shown in the drawing) during lapping of the surface 27 of the slider bar 37 shown in FIG. 2, which faces the recording medium. Therefore, the surface of the gap layer 18 which faces the recording medium is also ground appropriately. After the lapping is finished, the amount of protrusion of the gap layer 18 from the facing surface may be decreased to an amount smaller than a conventional magnetic head because of the lower restoring force of the gap layer 18 than the conventional head.

Like in the conventional magnetic head, in the use of a $Ta_2O_5$ film as the gap layer, the amount of protrusion from the facing surface is about 6 nm, while in the use of a $SiO_2$ film, the amount of protrusion from the facing surface is about 3.5 nm or more. However, in this embodiment, the amount of protrusion may be decreased to about 3.5 nm or less, and preferably be suppressed to about 3.0 nm or less.

In order to decrease the amount of protrusion as compared with a conventional amount, the Young's modulus E of the gap layer 18 is controlled. The Young's modulus E of the gap layer 18 is preferably about 123.2 (GPa) or more (about E>123.2 (GPa)). With the Young's modulus of about 123.2 (GPa) or more, the amount of protrusion of the gap layer 18 from the surface facing the recording medium may be decreased to about 3.5 nm or less.

In order to obtain the above Young' modulus E, the N content atomic % of the SiON film is preferably about 0 (at %)<N atomic %≦6 (at %).

In one embodiment, the Young's modulus E of the gap layer 18 is more preferably about E≧127.4 (GPa). With the Young's modulus of about 127.4 (GPa) or more, the amount of protrusion of the gap layer 18 from the surface facing the recording medium may be suppressed to about 3.0 nm or less. In order to obtain this Young' modulus E, the N content atomic % of the SiON film is preferably about 1 (at %)≦N atomic %≦6 (at %).

The isolation voltage of the SiON film is not much decreased, as compared with the $SiO_2$ film conventionally used as the gap layer 18, and thus the SiON film may be sufficiently used as the gap layer 18.

Like in the conventional magnetic head, in the present invention, the gap layer 18 may be made of a $SiO_2$ film. In this case, the condition that the Young's modulus E of the gap layer 18 is more than about 123.2 (GPa) (E>123.2 (about GPa) is added.

In the conventional magnetic head, in the use of the $Ta_2O_5$ film as the gap layer 18, the Young's modulus E of the gap layer 18 is about 113.9 (GPa), while in the use of the $SiO_2$ film, the Young's modulus E is about 123.2 (GPa) or less. However, even when the $SiO_2$ film is used as the gap layer 18 in the manufacturing method which will be describe below, the Young's modulus E of the gap layer 18 may be increased to about 123.2 (GPa) or more.

By increasing the Young's modulus E of the gap layer 18 to about 123.2 (GPa) or more, the amount of protrusion of the gap layer from the surface facing the recording medium may be decreased to about 3.5 nm or less.

The Young's modulus E of the gap layer 18 is more preferably about E≧127.4 (GPa). With the Young's modulus of about 127.4 (GPa) or more, the amount of protrusion of the gap layer 18 from the surface facing the recording medium may be suppressed to about 3.0 nm or less.

As described above, by using the SiON film or the $SiO_2$ film having a Young's modulus E of about 123.2 (GPa) or more as the gap layer 18, the amount of protrusion of the gap layer from the surface facing the recording medium may be decreased, as compared with the conventional magnetic head.

Therefore, even when the floating amount between the thin film magnetic head slider 36 and the recording medium decreases with increases in the recording density in future, the slider 36 collides less with the recording medium due to the protrusion of the gap layer 18. Whereby damage to the thin film magnetic head slider 36 and the recording medium may be prevented. Therefore, the present invention may provide a thin film magnetic head having high safety and reliability.

Although the gap layer 18 of the inductive head h2 has been mainly described above, these embodiments may also be applied to the lower gap layer 12 and/or the upper gap layer 16 formed in the MR head h1.

Besides the gap layers, these embodiments may be preferably applied to other layers, which are conventionally formed by using a $SiO_2$ film to be exposed at the surface facing the recording medium, because the protrusion of each of the layers from the surface facing the recording medium may be suppressed.

Particularly, these embodiments are preferably applied to a thin film magnetic head device in which a slider floats above the recording medium to record and reproduce. Thus, it is possible to avoid the collision of the slider with the recording medium. Therefore, these embodiments may be applied to not only the thin film magnetic head provided in a hard disk device but also an optical thin film magnetic head, or the like as long as it is a floating type thin film magnetic head device.

Figure 5:
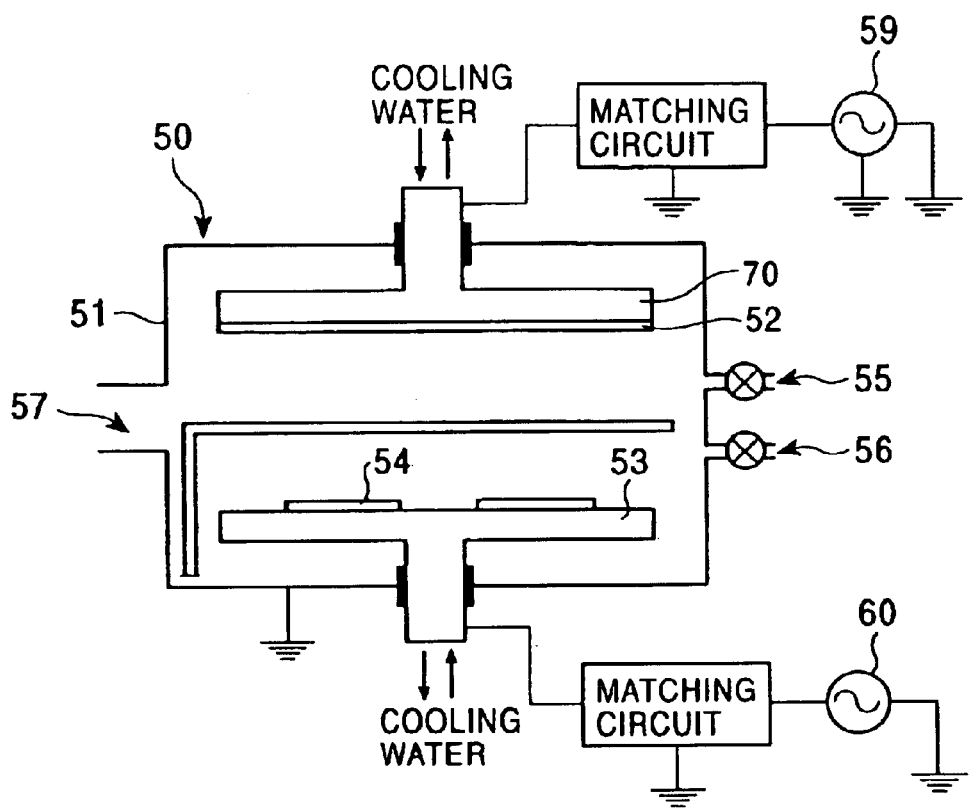
FIG. 5 is a partial drawing showing the internal structure of a sputtering apparatus.

The method of manufacturing the thin film magnetic head described below. FIG. 5 shows the internal structure of a sputtering apparatus used for manufacturing the thin film magnetic head.]

As shown in FIG. 5, an electrode portion 53 for mounting a target 52 thereon is provided in a chamber 51 of a sputtering apparatus 50, and a substrate holding portion 53 is provided at a position opposite to the target 52. Furthermore, a substrate 54 is provided on the substrate holding portion 53.

In the present invention, the sputtering apparatus 50 may be a magnetron sputtering apparatus comprising a magnet provided in the electrode portion 53 show in FIG. 5.

As shown in FIG. 5, gas inlets 55 and 56, and a gas exhaust port 57 are provided in the chamber 51 so that $N_2$ and Ar are respectively introduced through the gas inlets 55 and 56.

When a radio frequency is applied from a radio frequency power supply (RF power supply) 59, magnetron discharge occurs due to an interaction between an electric field and a magnetic field to sputter the target, thereby depositing a thin film on the substrate 54 arranged opposite to the target 52.

In depositing the gap layer 18 shown in FIGS. 3 and 4 by using the sputtering apparatus shown in FIG. 5, a target composed of $SiO_2$ is used as the target 52. Furthermore, $N_2$ and Ar are introduced as sputtering gases through the gas inlets 55 and 56.

By using the $SiO_2$ target and $N_2$ gas a sputtering gas, the gap layer 18 comprising a SiON film may be formed.

The flow rate ratio of the $N_2$ gas in the sputtering gases ($N_2$+Ar) is preferably about 0%<flow rate ratio of $N_2$ gas$\leq$30%. In this case, the N atomic % of the SiON film may be controlled to about 0 (at %) or more, and the Young's modulus E of the gap layer 18 becomes about 123.2 (GPa) or more. Preferably, the N atomic % of the SiON film may be controlled to about 1 (at %) or more. At the same time, the Young's modulus E of the gap layer 18 becomes about 127.4 (GPa) or more. This may be achieved by setting the flow rate ratio of the $N_2$ gas in the sputtering gases to about 5% or more.

As shown in FIG. 5, a radio frequency power supply (RF power supply) 60 is connected to the substrate holding portion 53 so that a radio frequency is applied to the substrate holding portion 53 from the radio frequency power supply 60.

In this way, in the present invention, a bias (Rf bias) electric power is preferably supplied to the substrate side during formation of the gap layer 18, whereby the Young's modulus E of the SiON film may be increased.

The Young's modulus E of the gap layer 18 may be increased by supplying the bias electric power during the formation of the gap layer 18 is because the SiON film may tend toward a closest-packed atomic arrangement. The elastic coefficient of the SiON film is increased due to the tendency to closest packing, i.e., reduction in the distance between atoms, to improve the Young's modulus E.

In the present invention, the bias electric power may be about 0 W (watt) or more. Namely, in the present invention, the bias electric power may be freely set.

In the present invention, as described above, the gap layer 18 comprising the $SiO_2$ film may be formed, but in the formation of the gap layer 18, the Young's modulus E of the gap layer 18 is about 123.2 (GPa) or more. In the present invention, in order to set the Young's modulus E of the gap layer 18 to about 123.2 (GPa) or more, the bias electric power is supplied to the substrate side during the formation of the gap layer 18.

In this way, when the $SiO_2$ film is deposited with the bias electric power supplied to the substrate side, the Young's modulus E may be improved, as compared with a case in which the gap layer is deposited with no bias electric power supplied. Specifically, the Young's modulus may be increased to about 123.2 (GPa) or more. The reason of this is as described above.

In the present invention, the bias electric power may be about 0 W or more. With the bias electric power of about 0 W or more, the Young's modulus E of the $SiO_2$ film may be increased to about 123.2 (GPa) or more.

The bias electric power is more preferably about 10 W or more. With the bias electric power of about 10 W or more, the Young's modulus E of the $SiO_2$ film may be increased to about 127.4 (GPa) or more.

As described above, in forming the gap layer 18 comprising the SiON film, a $SiO_2$ target conventionally used for depositing the $SiO_2$ film may be used, and the SiON film can be deposited only by mixing a $N_2$ gas as a sputtering gas.

The SiON film may easily be deposited with high reproducibility and little or no complication of the manufacturing method, as compared with a conventional method.

Since the flow rate ratio of the $N_2$ gas and the bias electric power may be freely set, the gas pressure and electric power may easily be controlled.

The gap layer 18 may be made of the $SiO_2$ film. In this case, however, the Young's modulus E of the $SiO_2$ film is about 123.2 (GPa) or more. The Young's modulus E may be controlled only by supplying the bias electric power to the substrate side. The $SiO_2$ film having this Young's modulus may easily be deposited with high reproducibility.

EXAMPLES

Figure 6:
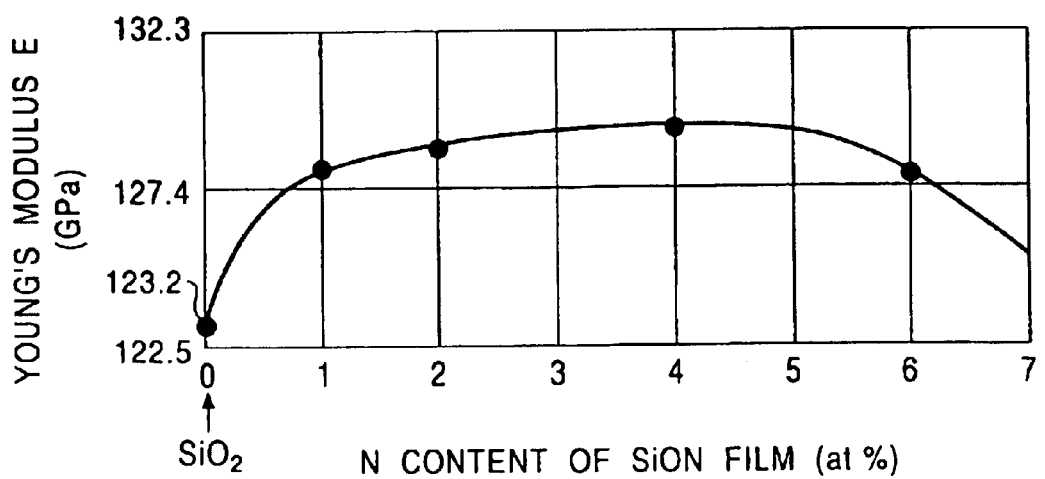
FIG. 6 is a graph showing the relation between the N content (at %) of a SiON film and Young's modulus E.

FIG. 6 is a graph showing the relation between the N atomic % of a SiON film and the Young's modulus E of the SiON film. The Young's modulus E was measured by a micro Vickers method. This applies to the other experiments below.

FIG. 6 indicates that the Young's modulus E increases as the N content (atomic %) of the SiON film increases. The Young's modulus E of a $SiO_2$ film not containing N was about 123.2 (GPa).

Next, the SiON film used in the above-described experiment was used as a gap layer of an inductive head, and the surface of the inductive head, which faced the recording medium, was lapped. Then, the relation between the Young's modulus E of the gap layer (SiON film) and the amount of protrusion of the gap layer from the facing surface was examined.

The SiON film used in the experiment had a N atomic % of each of about 1 (at %), about 1 (at %) and about 4 (at %). No bias electric power was applied during deposition of the films. As a comparative example, experiment was carried out by using a $Ta_2O_5$ film and a $SiO_2$ film. In any case, no bias electric power was applied during deposition of the films. The results of the experiment are shown in FIG. 7.

Figure 7:
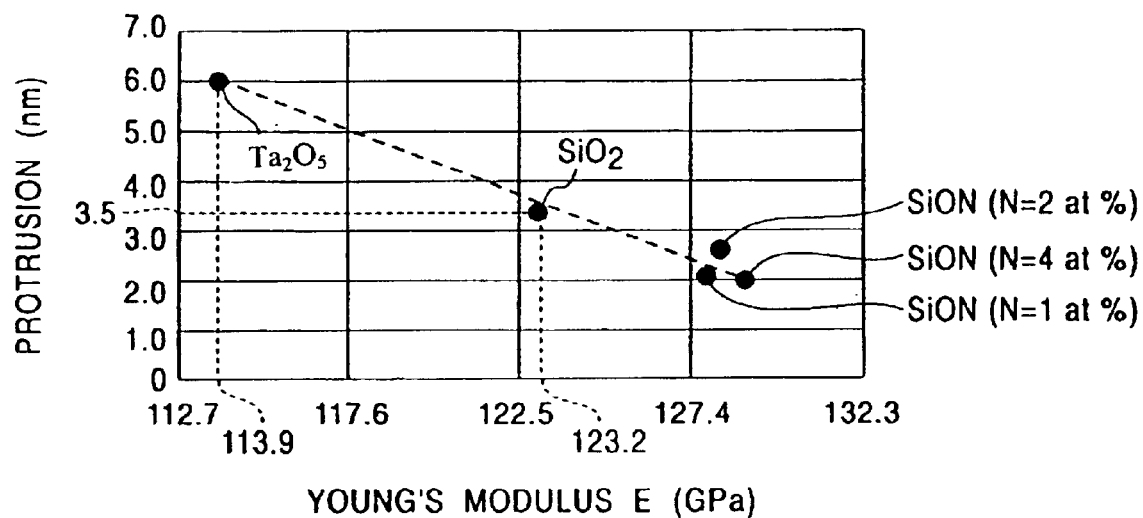
FIG. 7 is a graph showing the relation between the Young's modulus E of a SiON film or SiO film and the amount of protrusion of a gap layer when the film was used as the gap layer, and a surface facing a recording medium was lapped.

FIG. 7 reveals that the amount of protrusion decreases as the Young's modulus E increases. In this example, the Young's modulus E of the $Ta_2O_5$ film was about 113.9 (GPa), and the amount of protrusion was about 6.0 nm. The Young's modulus E of the $SiO_2$ film was about 123.2 (GPa), and the amount of protrusion measured was about 3.5 nm.

The experimental results indicate that the amount of protrusion is preferably about 3.5 nm or less, and at the same time, the Young's modulus E is about 123.3 (GPa) or more.

Refer to FIG. 6, with the SiON film having a N atomic % of about 0 or more, the Young's modulus E of about 123.2 (GPa) or more may be obtained, and thus the N atomic % of the SiON film is preferably about 0 (at %) or more.

In the present invention, the upper limit of the N atomic % is about 6 (at %). This is because with the N atomic % of over about 6 (at %), the Young's modulus E is decreased to about 127.4 (GPa) or less.

As shown in FIG. 7, with the Young's modulus E of 127.4 (GPa) or more, the amount of protrusion of the gap layer may be suppressed to about 3.0 nm or less. Therefore, the Young's modulus E is preferably in the range of about 127.4 (GPa) or more.

FIG. 6 indicates that with a Young's modulus E of about 127.4 (GPa) or more, the N atomic % of the SiON film is about 1.0 (at %) or more.

Next, the relation between the flow rate ratio of the $N_2$ gas in the sputtering gases (Ar and $N_2$) introduced into the sputtering apparatus in deposition of the SiON film and the Young's modulus E of the SiON film formed at the flow rate ratio was examined. The experimental results are shown in FIG. 8.

Figure 8:
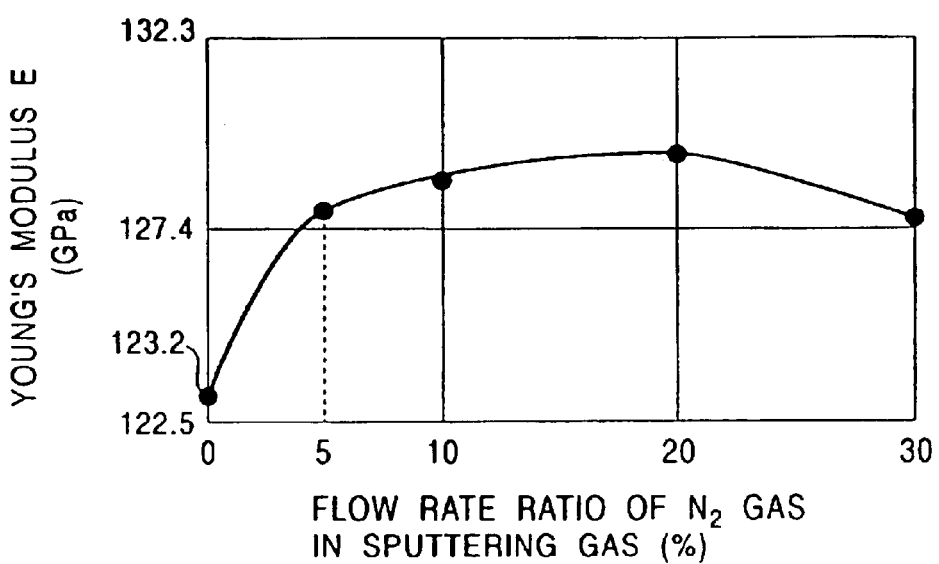
FIG. 8 is a graph showing the relation between the flow rate ratio (%) of $N_2$ gas in sputtering gases and the Young's modulus E of a SiON film.

FIG. 8 reveals that with the $N_2$ gas flow rate ratio of about 0% or more, the Young's modulus of the SiON film may be increased to about 123.2 (GPa) or more. Therefore, in the present invention, the flow rate ratio of the $N_2$ gas in the sputtering gases is about 0% or more. The maximum flow rate ratio of the $N_2$ gas is about 30% because with the $N_2$ gas flow rate ratio of about 30% or less, the more preferable Young's modulus E of about 127.4 (GPa) or more can be obtained, as shown in FIG. 8.

It is also found that in order to obtain the Young's modulus of the gap layer of about 127.4 (GPa) or more, the flow rate ratio of the $N_2$ gas in the sputtering gases is preferably about 5% or more.

Next, a SiON film and $SiO_2$ film were deposited by sputtering with the Rf bias electric power supplied to the substrate side. In this experiment, the N atomic % of each of the SiON films was set to about 1 at %. The experimental results are shown in FIG. 9.

Figure 9:
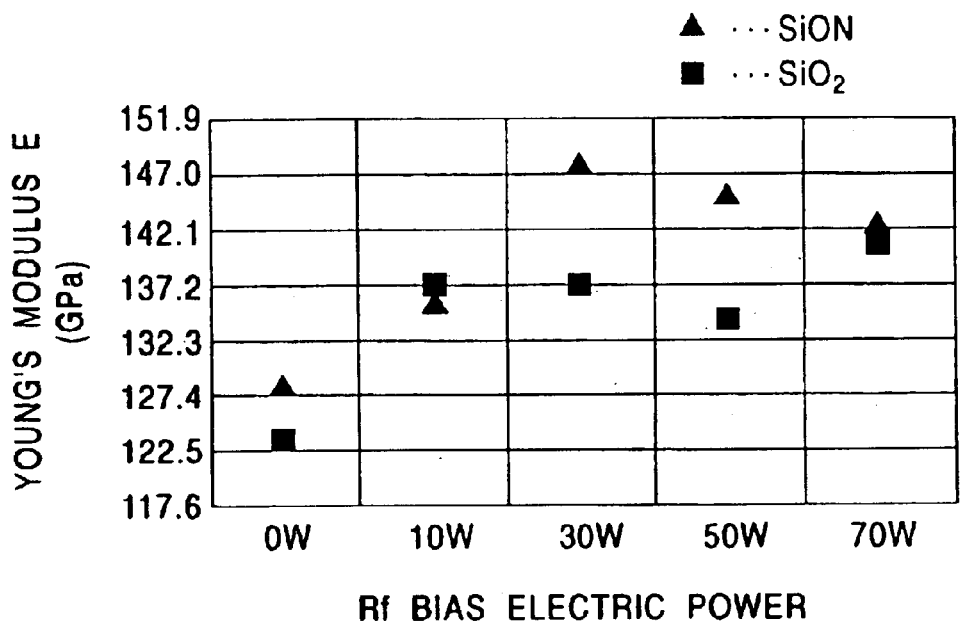
FIG. 9 is a graph showing the relation between the Young's modulus of each of SiON and $SiO_2$ films and the Rf bias electric power applied during deposition of each film.

FIG. 9 indicates that by depositing the SiON film while supplying the Rf bias electric power to the substrate side, the Young's modulus E of the SiON film may be increased, as compared with a case with no bias electric power supplied.

By depositing the $SiO_2$ film while supplying the bias electric power to the substrate side, the Young's modulus of the $SiO_2$ film may be increased. Namely, this experiment indicates that even when a $SiO_2$ film is used as the gap layer conventionally used as the gap layer, the Young's modulus E of the $SiO_2$ film may be increased by supplying the bias electric power during deposition of the film, and specifically, the Young's modulus E of about 123.2 (GPa) or more may be obtained. Even by using the $SiO_2$ film as the gap layer, the amount of protrusion of the gap layer from the surface facing the recording medium may be decreased, as compared with the conventional magnetic head, and specifically, the amount of protrusion may be suppressed to about 3.5 nm or less.

As shown in FIG. 9, with the Rf bias electric power of about 10 W or more, the Young's modulus E of the $SiO_2$ film may be increased to about 127.4 (GPa) or more. By using this $SiO_2$ film as the gap layer, the amount of protrusion of the gap layer can be suppressed to about 3.0 nm or less.

Figure 10:
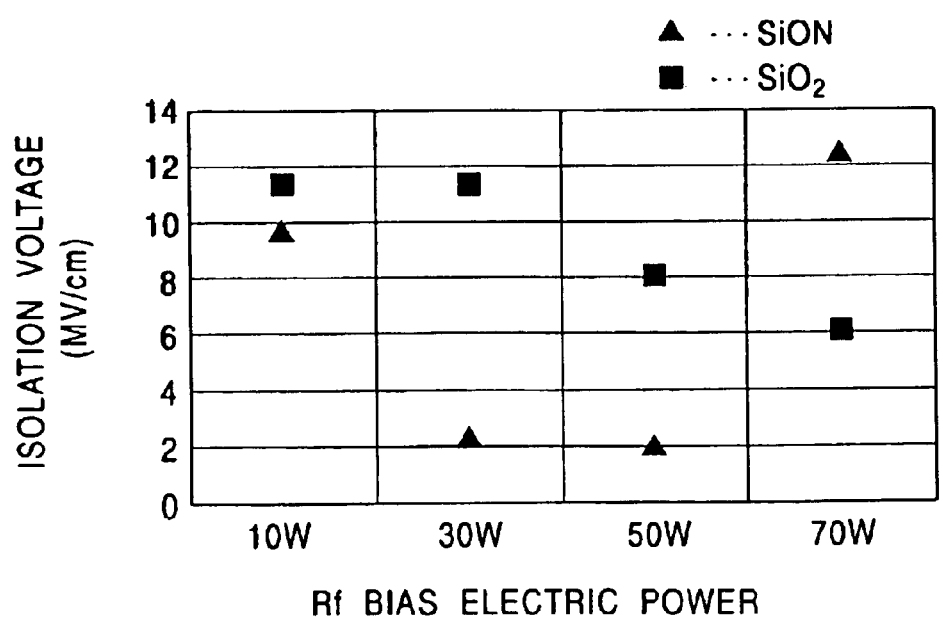
FIG. 10 is a graph showing the relation between the isolation voltage of each of SiON and $SiO_2$ films and the Rf bias electric power applied during deposition of each film.
Figure 11:
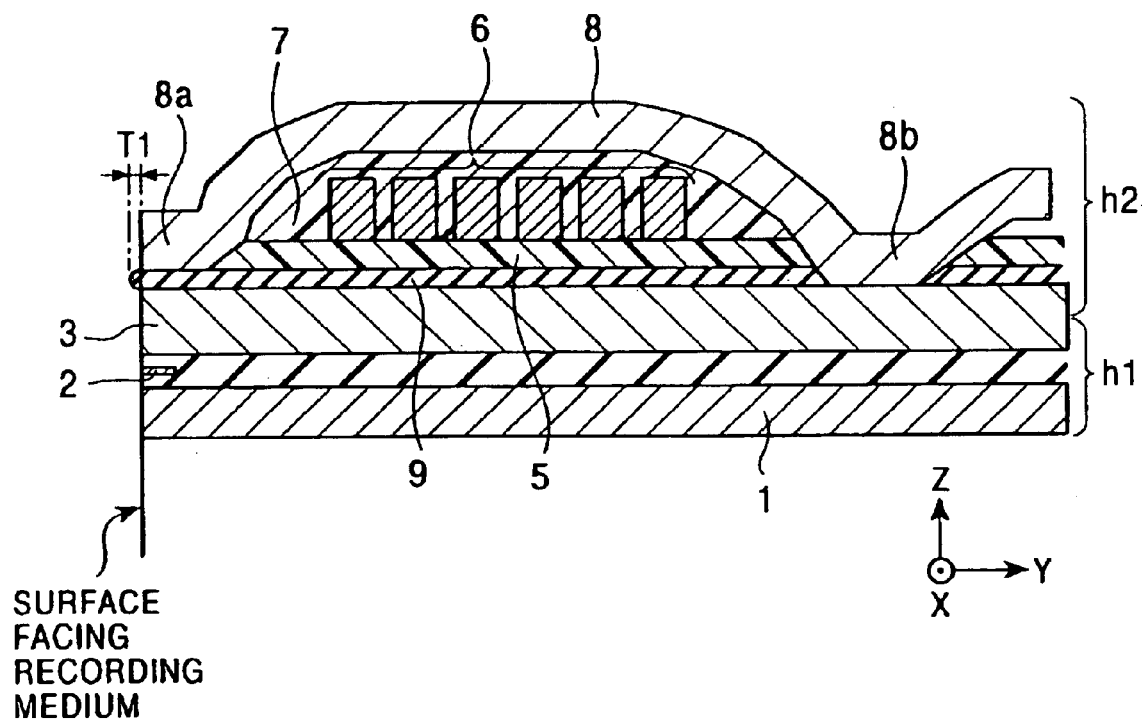
FIG. 11 is an enlarged sectional view showing the structure of a conventional thin film magnetic head according to the prior art.

FIG. 10 is a graph showing the relation between the Rf bias electric power and the isolation voltage of each of SiON film and $SiO_2$ film deposited with the bias electric power supplied.

FIG. 10 indicates that the SiON film has lower isolation voltage than the $SiO_2$ film, but satisfies the isolation voltage necessary for using as the gap layer.

It is also found that with the bias electric power of 10 W, the SiON film has substantially the same isolation voltage as the $SiO_2$ film, and both films maintain good isolation voltages.

As described above, by using a SiON film as a gap layer of an inductive head, the elastic coefficient of the gap layer may be increased, and thus the gap layer is less pushed from the facing surface in the height direction during lapping of the surface of the inductive head, which faces the recording medium. Therefore, like other layers, the gap layer may be appropriately ground, whereby the amount of protrusion of the gap layer from the facing surface may be decreased as compared with the conventional head.

A $SiO_2$ film having a Young's modulus of about 123.2 (GPa) or more may be used as the gap layer, and thus the elastic coefficient of the $SiO_2$ film may be increased, and the amount of protrusion of the gap layer from the facing surface may be decreased, as compared with the conventional head.

By using a thin film magnetic head having a small amount of protrusion of a gap layer, even when the floating amount between the thin film magnetic heed slider and a recording medium is decreased, the danger of collision of the thin film magnetic head slider with the recording medium during floating of the thin film magnetic head slider above the recording medium may be decreased to provide a thin film magnetic head having high safety.

In the manufacturing method of the present invention, a SiON film may be deposited only by using a $SiO_2$ target conventionally used for depositing a gap layer and $N_2$ gas as a sputtering gas, and thus the gap layer may be easily deposited with excellent reproducibility and no complication of the manufacturing steps, as compared with a conventional method.

In the use of a $SiO_2$ film as the gap layer, the Young's modulus of the gap layer may be increased by supplying a bias electric power to the substrate side as compared with a conventional gap layer. Therefore, a thin film magnetic head in which a gap layer is less protruded may easily be manufactured.

These embodiments may be applied to a gap layer used in a reproducing MR head.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A thin film magnetic head comprising:
   a magnetoresistive element capable of detecting a recording signal due to a change in electric resistance with an external magnetic field; and
   shield layers formed above and below the magnetoresistive element with gap layers provided therebetween,
   wherein the shield layers have a facing surface,
   wherein at least one of the gap layers comprises a SiON film having a Young's modulus E where E>123.2 (GPa).

2. A thin film magnetic head according to claim 1, wherein the atomic ratio of N of the SiON film is 0 (at %)<N atomic %≦6 (at %).

3. A thin film magnetic head according to claim 1, wherein the Young's modulus E of the at least one gap layer is E≧127.4 (GPa).

4. A thin film magnetic head according to claim 3, wherein the atomic ratio of N of the SiON film is 1 (at %)≦N atomic %≦6 (at %).

5. A thin film magnetic head comprising:
   a gap layer provided between cores made of a magnetic material; and
   a coil for inducing a recording magnetic field in the cores, wherein the gap layer comprises a SiON film, the atomic ratio of N of the SiON film being 0 (at %)<N atomic %≦6 (at %).

6. A thin film magnetic head according to claim 5, wherein the atomic ratio of N of the SiON film is 1 (at %)≦N atomic %≦6(at %).

7. A thin film magnetic head according to claim 5, wherein the Young's modulus E of the gap layer is E>123.2 (GPa).

8. A thin film magnetic head according to claim 7, wherein the Young's modulus E of the gap layer is E≧127.4 (GPa).

* * * * *